United States Patent [19]

Klein

[11] Patent Number: 4,550,279
[45] Date of Patent: Oct. 29, 1985

[54] STEP-BY-STEP MOTOR UNIT

[75] Inventor: Eric Klein, Les Hauts-Geneveys, Switzerland

[73] Assignee: Fabriques D'horlogerie De Fontainemelon S.A., Fontainemelon, Switzerland

[21] Appl. No.: 530,116

[22] Filed: Sep. 7, 1983

[30] Foreign Application Priority Data

Sep. 10, 1982 [CH] Switzerland .................. 5384/82

[51] Int. Cl.$^4$ .......................................... H02K 29/04
[52] U.S. Cl. .................................. 318/696; 318/685; 368/157
[58] Field of Search ............... 318/696, 685; 368/157, 368/188, 76, 160; 310/49 R

[56] References Cited

U.S. PATENT DOCUMENTS 4,030,283  6/1977  Sauthier et al. .................... 368/188
4,066,947  1/1978  Nakajima et al. .................. 318/696
4,382,693  5/1983  Tu Xuan ............................ 368/160
4,398,831  8/1983  Fatton et al. ......................... 368/76

Primary Examiner—William M. Shoop, Jr.
Assistant Examiner—Saul M. Bergmann
Attorney, Agent, or Firm—Peter L. Berger

[57] ABSTRACT

To increase the speed of rotation of a step-by-step motor in the forward or reverse direction, the motor is driven at its "synchronism" speed.

For the motor to perform N steps at high speed involves applying a starting drive pulse that induces forward or reverse motion, then applying N-2 alternating maintenance pulses and finally applying a stopping pulse. Preferably, a circuit using the coupling coefficient of the motor as a servo-control parameter defines the instants at which the maintainance or stopping pulses are applied.

5 Claims, 9 Drawing Figures

STEP-BY-STEP MOTOR UNIT

BACKGROUND OF THE INVENTION

This invention relates to a step-by-step motor unit suitable, inter alia, for use in an electronic watch having an analogue display, and more particularly to a step-by-step motor unit that enables increased rotational speed in both directions.

By motor unit is meant not only the motor as such, with its rotor and stator, but also the associated control circuit that generates the drive pulses that need to be applied to the motor depending on the required mode of operation.

In the case of a watch having a seconds-hand driven by a step-by-step motor and which correction is carried out mechanically, it suffices to have a motor which performs a number of steps per second equal to the number of steps that the seconds-hand must perform to move from one graduation to the next. This number is mostly less than six and sometimes equal to one. This means that the motor need only perform, at most, six steps per second. There is no problem in achieving such a speed of rotation for the motor.

However, in the case of a watch without a seconds-hand and in which corrections or time-zone changes need to be made by driving the motor the situation is different. The motor must be drivable both forward and in reverse with a considerably greater frequency, i.e. with a considerably greater number of steps per second. At present, with Lavet-type step-by-step motors, it is impossible to achieve satisfactory operation of the motors at frequencies greater than 50 Hz in the forward direction and 30 Hz in the reverse direction. In the case of a watch having a minutes-hand and an hours-hand and for which two motor steps are necessary for the minutes-hand to move forward by one graduation and assuming that the time-zone is to be moved back by five hours, roughly fourteen seconds will be needed to carry out this one correction. This is hardly acceptable to the user of the watch.

The advantage of having a motor that can be driven at high rotational speed thus becomes apparent.

For a better understanding of the problem reference will be made to FIGS. 1a and 1b of the accompanying drawings. FIG. 1a shows a conventional Lavet-type motor. The motor comprises a rotor 2 consisting of a permanent magnet having a North pole and a South pole, and a stator 4 fitted with a coil 6 receiving current drive pulses. Stator 4 involves two polar portions I and II linked by isthmuses 12 and 12' between which is provided an opening 8 housing the rotor 2. Opening 8 has, for example, two notches 10 and 10' that define a static equilibrium axis x'x for the rotor. Axis x'x defines, for the rotor, two rest positions that are 180° apart; the rotor spontaneously positions itself in one or other of these positions when no current flows in coil 6. FIG. 1a also shows an axis y'y corresponding to the two dynamic equilibrium positions of the rotor, i.e. the axis along which the South-North axis of the magnet tends to position itself when there is a current flowing in coil 6 and when, therefore, a magnetic field is created between the two polar portions I and II of the stator. For the sake of simplicity it will be assumed that the axis y'y coincides with the principal direction of the magnetic flux generated through the motor by coil 6 when the current flows through the latter. In fact, there is a slight angular difference between the two, due to the positioning torque brought about by the notches 10 and 10' and to which the rotor is permanently subjected. Angle $\alpha_1$ in FIG. 1a between axis x'x and axis y'y can range from 30° to 60°, the supplementary angle $\alpha_2$ ranging between 120° and 150°.

The direction of rotation F in FIG. 1 will be regarded as being the positive direction of rotation or forward operation of the motor, the opposite direction corresponding to reverse. Furthermore, a current pulse applied to coil 6 will be deemed positive if it creates a North pole in polar portion I and a South pole in polar portion II, and the pulse will be deemed negative in the opposite case.

Assuming that rotor 2 is in the position shown in FIG. 1a, i.e. the position for which the S-N axis of the magnet corresponds to the axis x'x, and assuming that a positive current pulse is applied to coil 6, the rotor will rotate in the positive direction of angle $\alpha_2$ until the S-N axis of the rotor coincides with the dynamic equilibrium axis y'y. When the pulse ceases, the rotor spontaneously settles in one of the two positions of static equilibrium on axis x'x, but reversed with respect to the initial position. To cause the rotor to perform another half-turn, i.e. the next step, a negative pulse is applied, setting up an N pole in portion II and an S pole in portion I. Thus, there is no problem in obtaining forward rotation, provided the rotation frequency is not too great: roughly 50 Hz at the most.

At such frequencies the time that elapses between the application of two drive pulses is sufficient compared to the duration of the drive pulse, to ensure that by the time a new pulse is applied the rotor will have reached its position of static equilibrium.

But if the motor is to rotate in reverse from that same initial position, a single negative pulse will not be sufficient because angle $\alpha_1$ between the axes of static and dynamic equilibrium is too small.

U.S. Pat. No. 4 112 671 describes reverse drive means for such a motor. These drive means are briefly described with reference to FIG. 1b. First, a brief positive pulse 14 is applied which causes the rotor to rotate in the positive direction by a slight angle. Then a negative pulse 16 is applied which actually corresponds to a reverse rotation. The positive pulse 14 causes the angle $\alpha_1$ to be artificially increased such that the rotor may reach a dynamic equilibrium position with sufficient mechanical energy to enable the next positive pulse 18 effectively to bring it to a static equilibrium position which is phase shifted by $\pi$ with respect to that it occupied initially. To perform the second step, a series of pulses 14', 16' and 18' are applied, identical to pulses 14, 16 and 18, but of opposite polarity.

This reverse, so called "swinging", operation of the motor, does not allow a high speed rotation of the motor, as set forth earlier.

To explain the operation of this type of motor reference will be made to a coupling coefficient $\gamma$. This coefficient is defined by the following relationship:

$$\gamma = -n \frac{d\phi}{d\alpha}$$

where n is the number of turns of coil 6, $\phi$ is the flux due to the rotor magnet flowing through the coil, and $\alpha$ the angle of rotation of the rotor. Of course $\alpha$ is a sinusoidal functon of angle $\alpha$:

$$\gamma = \gamma_0 \cdot \sin \alpha$$

$\gamma_0$ can be calculated from the geometric characteristics of the motor, from the magnetic characteristics of the permanent magnet of the rotor, and from the number of turns of the coil. A value $\gamma_0$ can therefore be found for every motor.

This value of $\gamma_0$ also makes it possible to define for the motor a synchronism frequency corresponding to the highest rotational speed that the motor can reach. This synchronism frequency, $F_s$, is obtained by the following formula:

$$F_s = \left| \frac{U_i}{2\pi\gamma_0} \right|$$

where $U_i$ is the true induced voltage.

SUMMARY OF THE INVENTION

A main object of the invention is to provide a motor unit able to rotate both forwards and in reverse at a speed close to that of synchronism, without however unduly complicating the structure and the control circuit of the motor.

According to the invention there is provided a motor unit comprising a motor having a rotor and a stator fitted with a coil, and a control pulse generating circuit for applying drive pulses to said coil to cause the rotor to rotate N steps in a first direction or in a second direction at high speed, said circuit comprising means for successively producing and applying to the coil:

a starting drive pulse to initiate rotation of the motor in one of said directions;

N-2 simple maintaining drive pulses of alternating polarity to cause the rotor to rotate N-2 steps in said one direction; and a simple stopping drive pulse having a polarity opposite to that of the last maintaining pulse.

The invention thus consists in first applying to a motor a reverse or forward starting pulse to start the motor in the required direction of rotation, then applying a series of simple maintaining pulses of alternating polarity to cause the motor to perform the required number of steps minus two, and then applying a simple stopping pulse having a polarity opposite to that of the last maintaining pulse. By "pulse" is meant either a single, "simple", pulse or a "compound" pulse, i.e. a pulse comprising several unitary pulses.

Driving step-by-step motors with chopped pulses is well known and it would be perfectly feasible to chop the above simple pulses or the above unitary pulses of composite pulses. The chopping serves to adapt the electric energy that is applied to the motor with every drive pulse to the actual energy needs of the motor for it to perform one step.

Preferably, the instants at which at least part of the maintaining pulses and the stopping pulse are applied are fixed on the basis of a magnitude that is representative of the variations of the coupling coefficient $\alpha$ of the motor in relation to the angle of rotation.

Depending on the type of step-by-step motor used, the forward and reverse starting pulse may vary. In all cases however, simple maintaining pulses and a simple stopping pulse are applied.

BRIEF DESCRIPTION OF THE DRAWINGS

In the accompanying drawings, given by way of example:

FIGS. 1a and 1b, described earlier, show respectively a conventional Lavet-type motor and a possible form of drive signal for driving in reverse the rotor of the motor shown in FIG. 1a;

FIG. 3b shows the various signals used in the control means of FIG. 3a;

FIG. 4 shows a modification of the control arrangement shown in FIG. 3a;

DETAILED DESCRIPTION

Figure 1A:
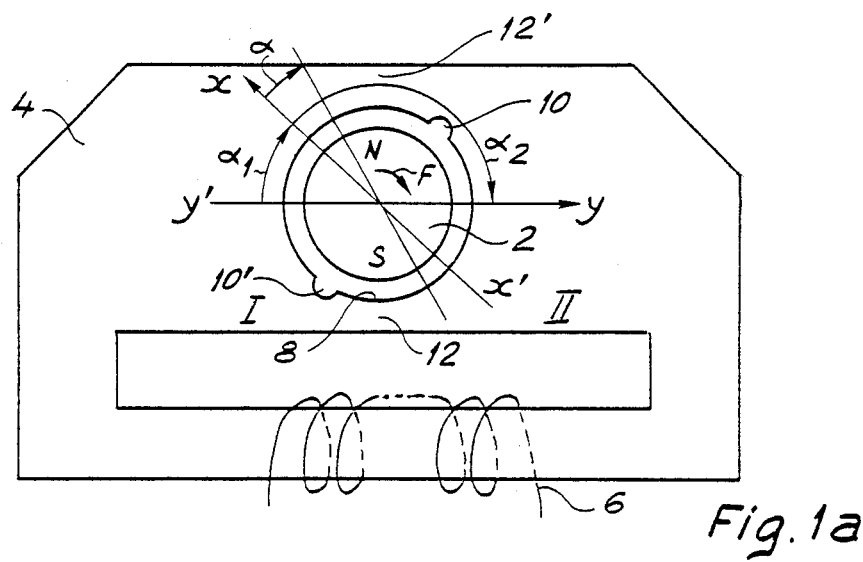
Figure 2A:
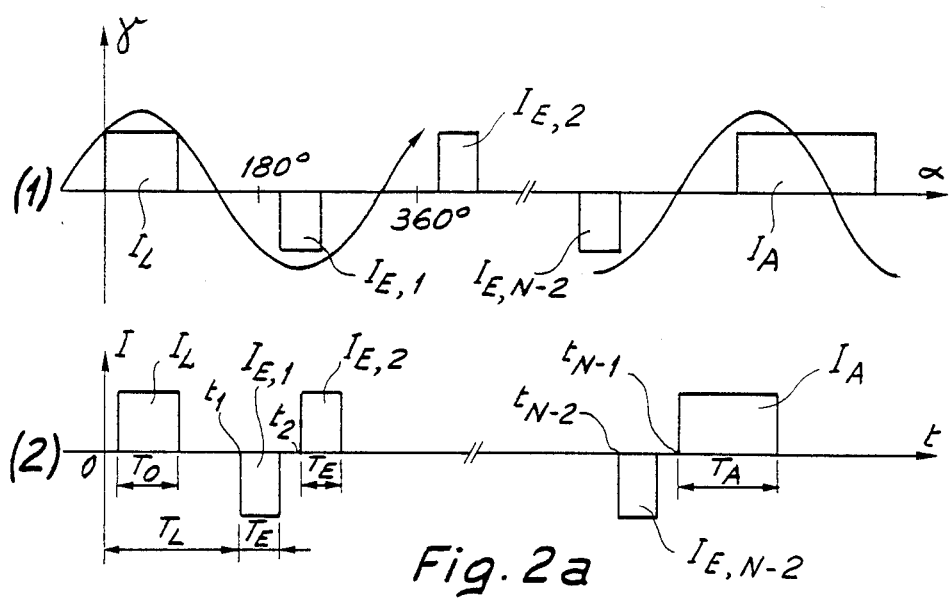
FIGS. 2a and 2b are graphs showing the shape of the drive pulses for driving the motor of a motor unit according to the invention, respectively forwards and in reverse at speeds close to that of synchronism.
Figure 2B:
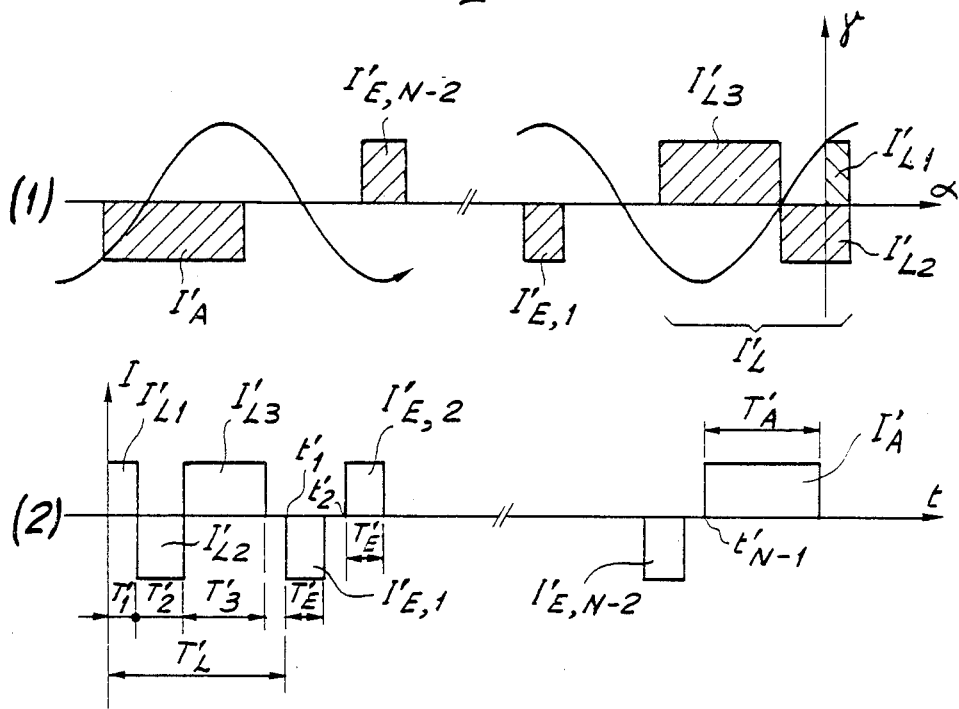

FIGS. 2a and 2b illustrate how drive pulses are applied to the motor to cause it to turn forwards (FIG. 2a) and in reverse (FIG. 2b), at substantially the speed of synchronism of the motor. The example considered here is the Lavet-type motor shown in FIG. 1a. But, as will be explained later, this kind of control may also be used for other bipolar or multipolar step-by-step motors.

Diagram 1 of FIG. 2a shows the position of the various drive pulses in dependence on the position of the rotor or, more particularly, as a function of the angle $\alpha$ made by an axis associated with the rotor and extending, for example, through the South and North poles, with respect to a reference position provided by the axis $x'x$ of static equilibrium of the rotor. First, in diagram 1, the variation in the coupling coefficient $\gamma$ is represented as a function of the angle $\gamma$. The definition of the coupling coefficient $\gamma$ has been given earlier. In diagram 1, forward rotation of the motor by N steps is brought about by applying three types of pulses: First a starting pulse $I_L$, then a series of maintaining pulses $I_{E,1}$ to $I_{E,N-2}$, and finally a stopping pulse $I_A$.

As shown in diagram 1, the optimum position of the maintaining pulses $I_E$ is for them to be centered on the angular positions corresponding to the extremes of the coupling coefficient as a function of the angle. Pulse $I_L$ serves to start the motor, in the forward direction in the case of diagram 1, and the stopping pulse $I_A$ serves to stop the rotor when the required N steps have been performed. In fact, to perform the required N steps only N-2 maintaining pulses are needed since both the starting pulse and the stopping pulse each cause the motor to move one step also.

Diagram 2 of FIG. 2a shows the position in time of the various drive pulses, including as before a starting pulse $I_L$, N-2 maintaining pulses $I_E$ and a stopping pulse $I_A$.

The starting pulse $I_L$ has a duration $T_0$. The maintaining pulses $I_E$ all have the same duration $T_E$ and the stopping pulse has a duration $T_A$. Further, the maintaining pulses $I_E$ and the stopping pulse $I_A$ are initiated at instants $t_1$ to $t_{N-1}$. These instants $t_1$ to $t_{N-1}$ may be set in two different ways.

If the number of steps N is limited, the instants of application of these pulses can be set in advance, according to the characteristics of the motor. The control means of the motor then apply the maintaining pulses and the stopping pulse at the pre-set instants depending on the number of steps to be performed. If the number of steps N is larger, the instants of application for the maintaining pulses and for the stopping pulse are set on the basis of available electrical magnitudes, representative of the variations in value of the coupling coefficient, in order that the maintaining and stopping pulses may be applied substantially at the angular positions indicated in diagram 1. These electrical magnitudes may be the current induced after the drive pulse, the speed induced voltage which is the induced voltage due only to the rotation of the rotor, or the total induced voltage.

The instants $t_1$ to $t_{N-1}$ are determined by comparing the value of these electrical magnitudes with a threshold. But with this self-servo-control system, the instant $t_1$, i.e. the instant when the first maintaining pulse is applied, may, a priori, be set. This instant $t_1$ appears at the end of time span $T_L$, the origin of which being the instant at which rotation is initiated. Thus, in the case, the self servo-control system only comes into operation after the first maintaining pulse $I_{E,1}$ has been applied to define instants $t_2$ to $t_{N-1}$.

Diagrams 1 and 2 of FIG. 2b are similar to diagrams 1 and 2 of FIG. 2a, but for driving the motor in reverse at substantially the speed of synchronism.

Figure 1B:
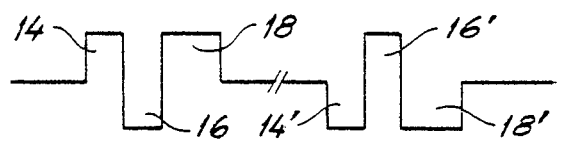

Diagram 1 again involves a starting pulse $I'_L$, N-2 maintaining pulses $I'_E$ and a stopping pulse $I'_A$, and shows that the maintaining pulses and the stopping pulse correspond exactly to the angular positions of the corresponding pulses for the forward drive. Diagram 1 corresponds to the case of a Lavet-type motor, described earlier. In other words, the starting pulse $I'_L$ is composite and is made up of unitary pulses or elements $I'_{L1}$, $I'_{L2}$ and $I'_{L3}$. These unitary pulses correspond to pulses 14, 16 and 18 in FIG. 1b. Pulse $I'_{L1}$ causes the rotor to rotate in the forward direction by a small angle; pulse $I'_{L2}$ causes the rotor to rotate in the reverse direction until it reaches a position close to that of its dynamic equilibrium y'y; and pulse $I'_{L3}$ moves the rotor to its static equilibrium position x'x, but offset by an angle $\pi$ with respect to its initial position.

Diagram 2 of FIG. 2b shows the arrangement of the various pulses in relation to time. The arrangement is the same as for operation in the forward direction, with the exception of the composite starting pulse $I'_L$. The duration of each of the unitary pulses or elements of the starting pulse may be set beforehand for any motor. For instance, the three unitary pulses have durations $T'_1$, $T'_2$ and $T'_3$. The first maintaining pulse $I'_{E,1}$ is applied to the coil after a starting time span $T'_L$, i.e. at instant $t'_1$, and the subsequent maintaining pulses are applied at instants $t'_2$, $t'_3$, etc. And the stopping pulse $I'_A$, of duration $T'_A$, is applied at instant $t_{N-1}$. As with forward operation, the instants $t'_i$ at which the maintaining and stopping pulses are applied may, for a given motor, be preset whenever the number of pulses to be applied, i.e. the number of steps to be performed, is relatively small. When the number of steps is larger, the instants $t'_i$ are determined by a servo-control system as with forward operation. Again, as with forward operation, the instant $t'_1$ at which the first maintaining pulse is applied may be preset, the servo-control system only becoming operative for the second maintaining pulse.

Thus, when the motor is to run at high speed, i.e. at substantially its synchronism speed, the number of steps to be performed by the motor may be fixed, but not the instant at which each step is performed. With forward operation, the servo-control system simply applies maintaining pulses at synchronism frequency but, as explained earlier, the rotor is effectively kept going by the maintaining pulses, independently of any servo-control. In reverse operation, the object of the servo-control defining instants $t'_i$ is not only to keep the rotor going at synchronism speed but also, in the case of the motor of FIG. 1, to initiate every step by the application of a simple maintaining pulse, whereas with the prior art driving system each step must be initiated by applying composite pulses of the kind shown in FIG. 1b.

Figure 3B:
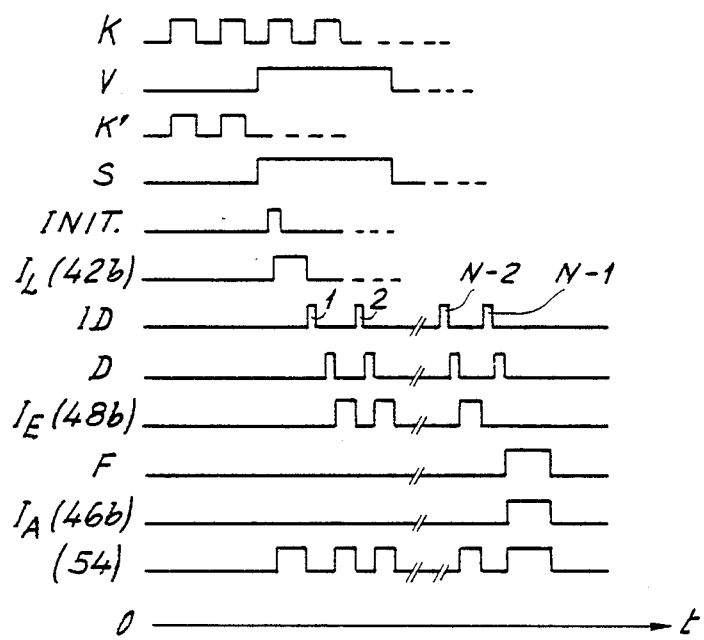
Figure 3A:
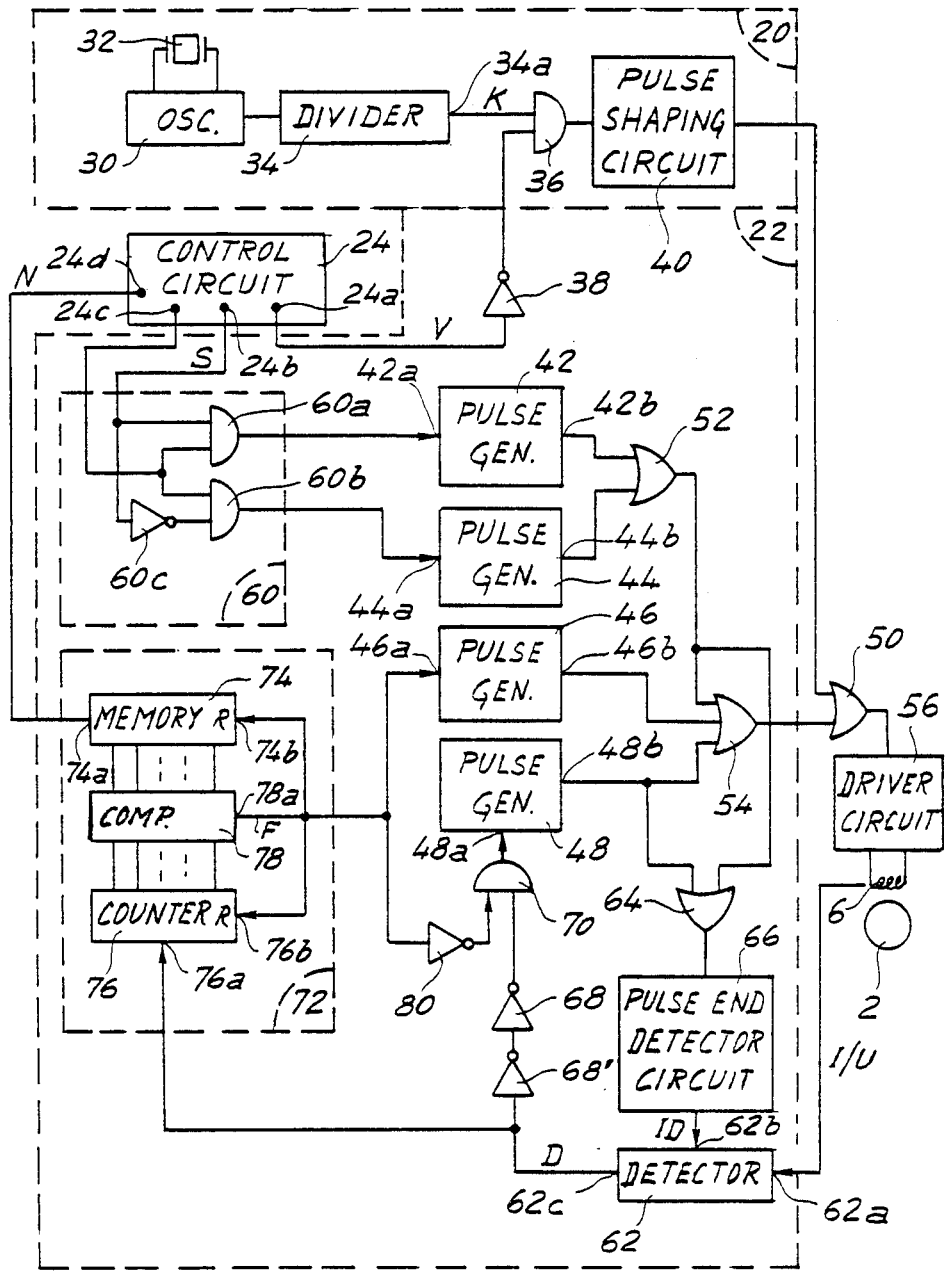
FIG. 3a is a general diagram of a first form of control arrangement for a motor unit according to the invention.

The control arrangement shown in FIG. 3a, enables a motor to be driven in the forward direction at normal speed and at a synchronism speed, and to be driven also in the reverse direction at synchronism speed.

It comprises a circuit 20 for generating normal drive pulses and a circuit 22 for generating high speed drive pulses for forward or reverse operation, both these circuits being controlled by signals generated by a control circuit 24. When the motor is fitted in a watch, the user has at his disposal a number of controls for implementing the various functions of the watch.

Circuit 24 issues on its first output 24a a signal V having a logic level 1 if the motor is to be driven at high speed and a logic level 0 in the opposite case. Thus, when the manual controls for operating the watch are at rest, signal V is nil. On its second output 24b, circuit 24 issues a signal S defining the direction of the rotation of the motor. This signal S only appears when the motor is driven at high speed. The value of signal S is, for example, 1 for forward operation and 0 for reverse operation. On output 24c, circuit 24 delivers a signal INIT for initiating high speed operation. Finally, on output 24d, circuit 24 delivers a signal N indicating the number of steps N to be performed by the motor.

The invention is not concerned with the way in which signals V, S, INIT and N are generated. The structure of circuit 24 will therefore not be described.

Circuit 20, for generating normal drive pulses, comprises an oscillator 30, having associated therewith a quartz resonator 32, which issues to dividing stages 34 a signal having a frequency of, for example, 32867 Hz. Output 34a of the dividing unit 34 issues a signal K having a frequency equal to the motor control frequency. For example, signal K has a frequency of 1/30 Hz if, under normal operating conditions, the motor is to perform two steps per minute. This corresponds, for example, to a watch having no seconds-hand and having to perform two steps to move from one minutes graduation to the next. Signal K is applied to one of the inputs of an AND gate 36, the other input receiving signal V via an inverter 38. Gate 36 therefore delivers the signal K for normal motor drive when control signal V has a logic level 0, i.e. when the high speed is not on. The output of gate 36 is connected to a pulse shaping circuit 40 designed to provide each drive pulse with an appropriate breadth.

Generating circuit 22 comprises four pulse generators 42, 44, 46 and 48 for producing, respectively, the forward starting pulse, the reverse starting pulse, the forward or reverse stopping pulse, and the forward or reverse maintaining pulses. These generators have activation inputs 42a to 48a, which determine the instants at which the corresponding pulses begin, and outputs 42b to 48b, which issue the actual pulses. Outputs 42b to 48b are connected to one of the inputs of an OR gate 50 via a pair of OR gates 52 and 54. Logic gate 50 receives on its second input the signal issued by the pulse shaping circuit 40. The output of logic gate 50 is connected to the input of a driver circuit 56 which actually applies the drive pulses to the coil 6 of the motor. Thus, when control signal V has a logic level 0, normal drive pulses are applied to the coil 6, and when control signal V has a logic level 1, high speed drive pulses from OR gate 54 are applied to the coil 6.

Generating circuit 22 further comprises various means for defining the instants at which the pulse generators 42 to 48 must be activated in order to generate the corresponding signals. The activation inputs 42a and 44a of generators 42 and 44 receive the INIT signal via switch 60. Generators 42 and 44 are activated by the rising edge of the INIT signal and switch 60 is controlled by the logic value of signal S. In FIG. 3, switch 60 is shown to consist of AND gates 60a and 60b and of an inverter 60c. This switch could of course consist of MOS circuits.

When the value of signal S is 0, the INIT signal is applied to the input 44a of reverse starting pulse generator 44, and when the value of signal S is 1, the same INIT signal is applied to forward starting pulse generator 42.

As explained earlier, the instants $t'_1$ to $t'_N$ for applying the maintenance pulses and the stopping pulse are defined in this form of embodiment by subjecting them to a magnitude related to the operation of the motor. To this end, the control circuit has a detector 62 which receives on its input 62a a signal representative of a magnitude related to the operation of the motor, and more particularly to the position of its rotor. This magnitude is preferably either the current that is induced after the end of the previous drive pulse, or the induced voltage. Detector 62 also has an activation input 62b which initiates the comparison that is made between a predetermined threshold and the value of the magnitude that is representative of the position of the rotor. When the comparison with the predetermined threshold is checked, the detector emits a detection pulse D.

The output of OR gate 52 and the output 48b of maintenance pulse generator 48 are connected to the inputs of an OR gate 64 whose output is connected to a pulse end detector circuit 66. The output of circuit 66 issues a pulse having a rising edge which coincides with the falling edge of the pulses applied to the circuit 66. The output of circuit 66 is connected to the activation input 62b of detector 62. Thus, each time a falling edge of the starting pulse or of a maintenance pulse appears, the detector is activated. Signal D is applied firstly to the activation input 48a of generator 48 via two inverters 68 and 68' and a gate 70, and secondly to a circuit 72 for determining the instant of application of the stopping pulse. Circuit 72 comprises a memory 74 which receives the signal N on its activation input 74a. Memory 74 memorises the number N-1, i.e. the total number of maintenance pulses plus the stopping pulse. Circuit 72 also comprises a counter 76 having a clock input 76a which receives the detection pulses D. Counter 76 is therefore incremented by one unit each time a maintenance pulse is applied to the coil of the motor. The states of memory 74 and of counter 76 are compared by a comparator 78, which issues on its output 78a a comparison signal F when the contents of counter 76 reaches the value memorised in memory 74. Thus, when the counter reaches N-1, the pulse causing the motor to perform its Nth step is applied, this pulse being the stopping pulse. To that end, a signal F is applied to the activation input 46a of generator 46 which issues the stopping pulse. Signal F is also applied to the second input of AND gate 70 via inverter 80. Thus, when the signal F appears, generator 46 issues the stopping pulse whereupon gate 70 is also closed. Consequently, maintenance pulse generator 48 is not activated by the detection pulse D. The purpose of inverters 68 and 68' is to cause a delay such that pulse D will only be applied to the input of gate 70 after the possible generation of signal F. Furthermore, signal F is applied to reset inputs 74b and 76b of memory 74 and counter 76. The circuit is then ready to receive new instructions for high speed forward operation.

FIG. 3b shows the time diagrams for the various signals used in the circuit.

In the form of embodiment described above, the control pulses are all of fixed duration. Pulse generators 42 to 48 could therefore be made up of monostable circuits having a time constant that is equal to the required duration of the pulses. In the case of generator 44, three monostable circuits would be needed. These would be activated successively to generate the three unitary pulses of the composite reverse starting pulse. However, since a watch would be provided with a frequency divider receiving on its input a signal at roughly 32 kHz, it might be preferable to use these periodic signals for generating the pulses.

Figure 5:
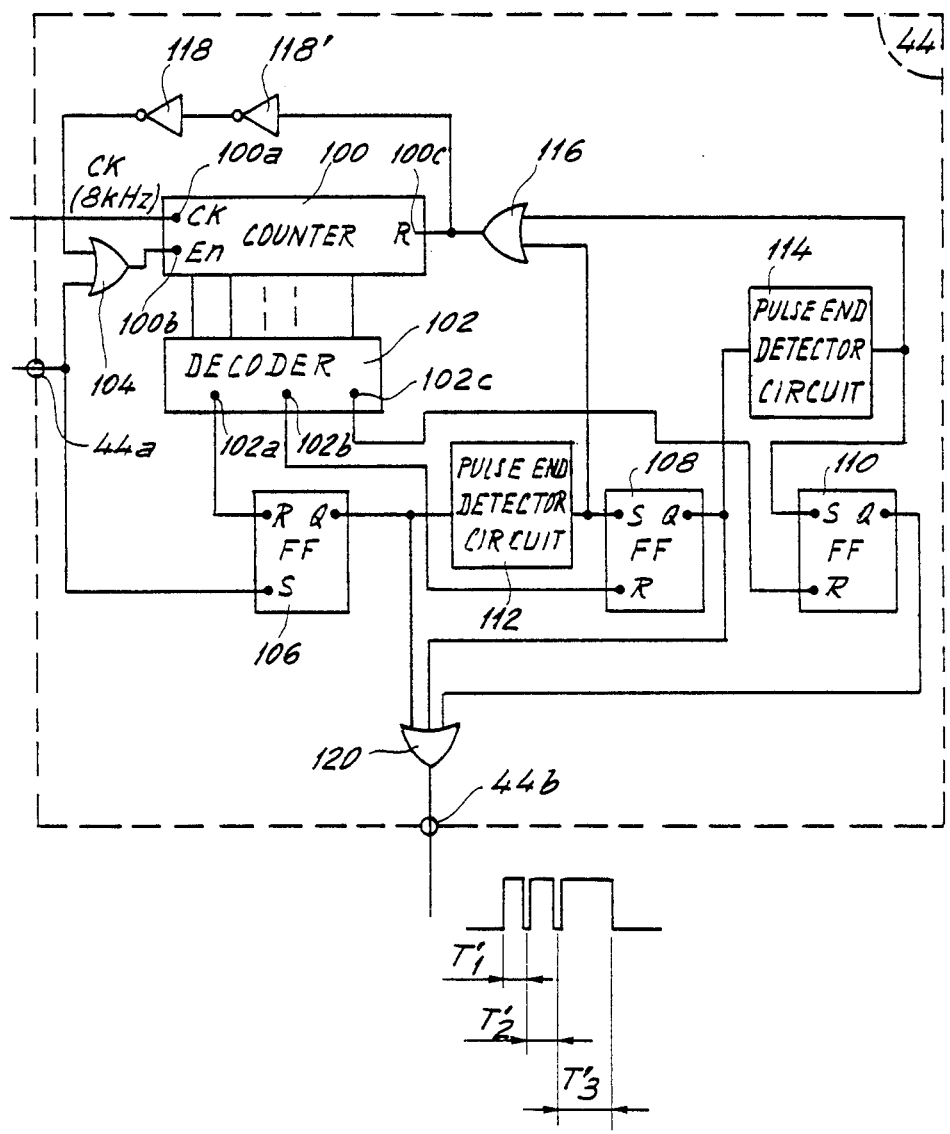
FIG. 5 is a diagram of a part of FIG. 3a or FIG. 4 showing one form of circuit for producing drive pulses.

FIG. 5 shows a possible form of embodiment of the signal generator 44 that issues the reverse starting pulse.

Pulse generator 44 comprises a counter 100 which receives on its clock input 100a from divider 34 a time signal having, for example, a frequency of 8 Hz. Counter 100 is associated with a decoder 102 which receives on its inputs the binary state outputs of counter 100. Decoder 102 permanently compares the state of counter 100 with memorised values. In the case of generator 44, the decoder compares with three values. When equality is reached the decoder issues a signal on one of its outputs 102a to 102c. At this frequency of 8 kHz, the counter must count eight pulses to measure a duration of one millisecond. It is thus a simple matter to determine the number of pulses having to be counted to measure the times $T'_1$, $T'_2$ and $T'_3$ used in generating the reverse starting pulse. These various times correspond to three lots of pulses memorised in decoder 102. The outputs 102a to 102c issue a signal whenever a counted number of pulses corresponds, respectively, to times $T'_1$, $T'_2$ and $T'_3$. Moreover, the activation input 100b of counter 100 is connected to the input 44a of generator 44 via an OR gate 104. Each time a signal is applied to the input 100b, the counter is incremented by the time pulses applied to its clock input 100a. The generator further comprises three RS type flip-flops 106, 108 and 110. Each flip-flop has an input S, an input R and an output Q. The inputs R are connected respectively to outputs 102a to 102c of the decoder. The input S of flip-flop 106 is connected to the input 44a of the generator. The input S of flip-flop 108 is connected to the output Q of flip-flop 106 via a pulse end detector circuit 112, and the input S of flip-flop 110 is connected to the output Q of flip-flop 108 via a pulse end detector circuit 114. The circuits 112 and 114 simply serve to generate pulses for controlling the flip-flops on the falling edge of the signals issuing from the outputs Q of the flip-flops.

The outputs of circuits 112 and 114 are connected via an OR gate 116 to the reset input 100c of counter 100. The output of OR gate 116 is also connected to the second input of OR gate 104 via two inverters 118 and 118', the purpose of these inverters being to cause a certain delay. And the outputs Q of flip-flops 106, 108 and 110 are connected to the three inputs of OR gate 120 whose output is connected to the output 44b of generator 44.

The operation of the generator will now be described. Initially, input 44a is reset, thereby blocking the input 100a of counter 100; the outputs of counter 100 and of flip-flops 106 to 110 are also reset. When a signal is applied to the input 44a of the generator, the output of flip-flop 106 switches to the value 1 and counter 100 is incremented by the clock pulses CK. When the output 102a emits a signal, i.e. when time $T'_1$ has been counted, the output of flip-flop 106 is reset. At that instant, the pulse end detector circuit 112 issues a pulse which, firstly, sets the output Q of flip-flop 108 to the logic level 1 and resets counter 100 to 0 and, secondly, reactivates counter 100 with a slight delay. The same process recurs until the output 102b of the decoder applies a signal to the input R of flip-flop 108. At that instant, the second pulse, of duration $T'_2$, is emitted on output 44b. Finally, the same cycle is repeated with flip-flop 110 to produce the pulse of duration $T'_3$. When the pulse appearing on output 102c of the decoder actually occurs, flip-flop 110 is reset, and so is counter 100 by means not shown.

The starting pulses $I'_{L1}$, $I'_{L2}$ and $I'_{L3}$ are thus actually obtainable on output 44b, but all with the same polarity. Alternate polarity is achieved by means of the driver circuit 56. A similar but simpler structure may be used for the generators 42, 46 and 48.

Figure 4:
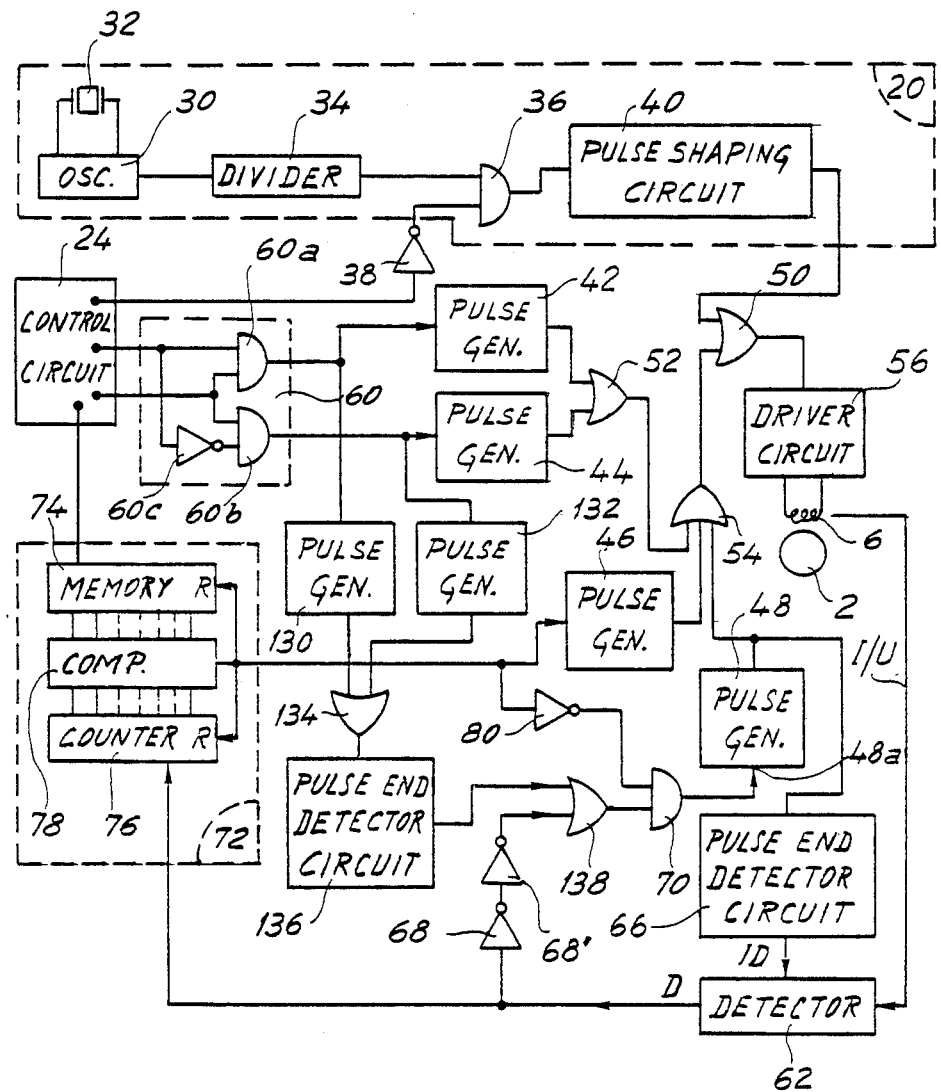

The FIG. 4 modification of the FIG. 3 circuit is used when the instant of application of the first maintenance pulse is predetermined and has a value $T_L$ for forward operation and a value $T'_L$ for reverse operation. The same references are used as in FIG. 3 to designate corresponding parts. The actuating pulse generating circuit 20, the inverter 60, the pulse generators 42 to 48, the pulse end detector circuit 66 and the detector circuit 62 are unchanged. Circuit 72, which determines the instant of application of the stopping pulse, is also identical except that its memory 74 is set to the value N-2 when signal N is applied by control circuit 24. Generators 42 and 44 are supplied by the outputs of switch 60. Similarly, the output of comparator 78 is directly connected to the input of generator 46 and is connected to the input of generator 48 via inverter 80 and AND gate 70. The difference lies in that the output of AND gate 60a of switch 60 is also connected to the input of another pulse generator 130 which defines duration $T_L$ for forward operation, and that the output of AND gate 60b of switch 60 is connected to the input of a further pulse generator 132 which defines duration $T'_L$ for reverse operation. The outputs of generators 130 and 132 are connected to the inputs of an OR gate 134 whose output is connected to the input of a pulse end detector circuit 136 identical to circuit 66. Circuit 136 thus issues a pulse at the end of the pulse issued by generator 130 or 132. The output of the pulse end detector circuit 136 is connected to one of the inputs of an OR gate 138. The other input of OR gate 138 receives signal D delayed by inverters 68 and 68'. The output of OR gate 138 is connected to the second input of AND gate 70.

In the FIG. 4 embodiment, the INIT pulse activates not only generator 42 or 44 depending on the required direction of rotation, but also generator 130 or 132 depending on the required direction of rotation. As in FIG. 3, the starting pulses are issued by generators 42 and 44. However, the starting pulse does not activate detector 62 since the pulse end detector circuit 66 is not connected to the outputs of generators 42 and 44. When the pulse issued by generator 130 or 132 ends, and if comparator 78 has not issued identity signal F, a pulse is applied to the activation input of generator 48 causing it to issue the first maintenance pulse. After the output signal of generator 130 or 132 is back to 0, gate 138 continuously receives on one of its inputs a signal having a logic level 0. The circuit as a whole then acts in exactly the same manner as that of FIG. 3 for the application of the second, third, etc., maintenance pulses and the application of the stopping pulse.

Figure 6:
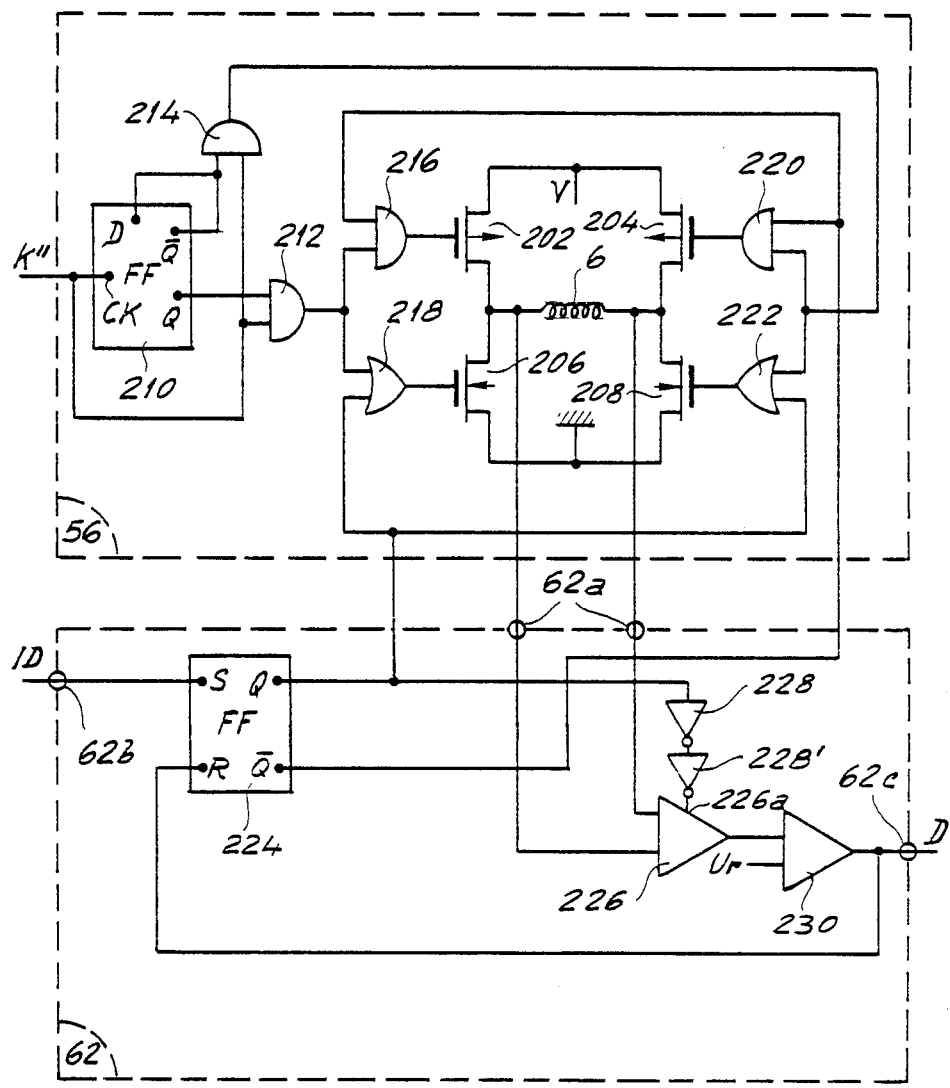
FIG. 6 is a diagram of a part of FIG. 3a or FIG. 4 providing means for servo-controlling the instant of application of the maintaining and stopping pulses.

FIG. 6 shows in greater detail a possible form of embodiment for the driver circuit 56, and for the detector circuit 62 in the case where the instants of application of the maintenance and stopping pulses are defined on the basis of the induced voltage after the previous actuating pulse.

Circuit 56 comprises a bridge consisting of two P-channel MOS transistors 202 and 204 and of two N-channel MOS transistors 206 and 208 which are controlled to apply in either direction a voltage V to coil 6 of the motor. Actually, circuit 56 enables not only to apply the alternating drive pulses, but also, first, to put coil 6 in open circuit after each drive pulse in order to improve the operation of the motor and, second, and most importantly, to measure the induced voltage.

Control signal K" issued by gate 50 is applied to the clock input CK of a D-type flip-flop 210. Output Q of flip-flop 210 is connected to one input of an AND gate 212, while output $\overline{Q}$ is connected firstly to the input D of the flip-flop and secondly to one input of an AND gate 214. The second inputs of gates 212 and 214 receive signal K". Thus, the pulses of signal K" appear alternately on the output of gates 212 and 214. The output of gate 212 is connected firstly to one input of an AND gate 216 and secondly to one input of an OR gate 218. The outputs of these gates are connected to the gates of transistors 202 and 206. Symmetrically, the output of gate 214 is connected to one input of an AND gate 220 and to one input of an OR gate 222. The outputs of these gates are connected to the gates of transistors 204 and 208. Disregarding gates 216 to 222, circuit 56 is a conventional driver circuit for a motor coil.

Detection circuit 62 comprises an RS flip-flop 224 whose S input is connected to input 62b of circuit 62. The S input of flip-flop 224 thus receives signal ID. The purpose of the Q output of flip-flop 224 is, first, to open the circuit of coil 6 and, second, to determine when the measuring of the induced voltage used to determine instants $t_i$ and $t'_i$ is to begin. To fulfil the first function, the Q output of flip-flop 224 is connected to the second inputs of gates 218 and 222. The $\overline{Q}$ output is connected to the second inputs of gates 216 and 220.

Terminals 6a and 6b of coil 6 are connected to the two inputs 62a of circuits 62. Inputs 62a are connected to the inputs of a subtracter 226 which issues a signal equal to the difference of the voltages applied to its two inputs when an activation signal is applied to its control input 226a. Control input 226a receives the signal that is issued by the Q output of flip-flop 224 with a delay of roughly 0.2 ms. This delay is introduced, for example, by two inverters 228 and 228'. Circuit 62 also comprises a comparator 230 which receives on one of its inputs the signal issued by subtracter 226, i.e. the induced voltage $U_i$, and on its other input a reference voltage $U_r$. Comparator 230 issues on output 62c detection signal D whenever the induced voltage $U_i$ becomes greater than the reference voltage $U_r$.

The circuits 56 and 62 operate as follows. When the motor is driven at normal speed there is no signal ID. The Q output of flip-flop 224 is set to 0 and the $\overline{Q}$ output is set to 1. Therefore, on the one hand, circuit 226 is not excited and, on the other hand, OR gates 218 and 222 receive on their second input the signal 0 and AND gates 216 and 220 receive on their second input the signal 1. The four gates 216 to 222 thus issue, respectively, the signal applied to their first input. The drive pulses are thus being applied to coil 6 in the normal alternating manner.

When the motor is driven at high speed, a first signal ID appears at the end of starting pulse $I_L$ or $I'_L$ (as in FIG. 3a), or at the end of the first maintenance pulse $I_{E,1}$ or $I'_{E,1}$ (as in FIG. 4). This pulse sets the Q output of flip-flop 124 to 1 and the outputs of AND gates 216 and 220 to 0. Consequently, the four transistors 202 to 208 are blocked. Coil 6 is thus in open circuit. Subtracter 226 receives on its inputs the value of the induced voltage $U_i$. After 0.2 ms, subtracter 226 is activated and thus issued on its output a voltage equal to the induced voltage. Whenever said voltage becomes greater than $U_r$, a signal D appears on the output of comparator 230. As explained earlier, this signal D is applied to the input of pulse generator 48. Simultaneously, signal D is applied to the R input of flip-flop 224. The Q output of the flip-flop is thus reset to 0 and the $\overline{Q}$ output to 1. Gates 216 to 222 are thus ready again to receive a signal to initiate the next maintenance pulse or the stopping pulse.

Tests have been carried out on a bipolar Lavet-type motor having the following characteristics:
diameter of stator: 2.40 mm; diameter of rotor: 1.60 mm; number of turns of coil: 8200; resistance of coil: 20 kΩ.

The following parameters were chosen:

$U_r = 50$ mV for forward operation:

$T_0 = 4$ ms; $T_L = 7$ ms; $T_E = 3.5$ ms; and $T_A = 7$ ms for reverse operation:

$T_1 = 2$ ms; $T_2 = T_3 = 5$ ms;

$T_L = 13$ ms; $T_E = 3.5$ ms; and $T_A = 7$ ms.

With such an arrangement, the motor may actually run in both the forward and reverse directions at a frequency very close to the theoretical synchronism frequency which is roughly 200 Hz. Also, the motor can actually be stopped after applying stopping pulse $I_A$ or $I'_A$.

Further, the supply voltage range is substantially increased with respect to that achieved under normal operating conditions, particularly in the case of reverse operation.

As explained earlier, other electric magnitudes representative of the variations in the coupling coefficient, i.e. in the position of the rotor, could also be used. Only detector 62 need then be modified.

Moreover, other types of motor could be used in the motor unit according to the invention, one possibility being for example a motor derived from the Lavet type in which the position of static equilibrium makes an angle of 90° with the position of dynamic equilibrium of the rotor. For this, the stator comprises two diametrically opposed saturable zones defined by notches, and two zones having a high reluctance variation, also diametrically opposed. Additionally, the four zones are symmetrically arranged in relation to the position of static equilibrium. With such a motor, the reverse starting pulse $I'_L$ consists of a single pulse having the same duration as the forward starting pulse $I_L$.

The motor units described and illustrated are particularly suitable for watches having an analogical display. However, other applications of interest for such step-by-step motor units may be found in other technological fields.

I claim:

1. A motor unit comprising a stepping motor having a rotor and a stator fitted with a coil, and a control pulse generating circuit for applying drive pulses to said coil to cause the rotor to rotate N steps at high speed, said rotor capable of a forward or reverse rotation of said N steps, said circuit comprising means for successively producing and applying to the coil:
   a starting drive pulse to initiate rotation of the motor in one of said directions;
   N-2 simple maintaining drive pulses of alternating polarity to cause the rotor to rotate N-2 steps in said one direction; and
   a simple stopping drive pulse having a polarity opposite to that of the last maintaining pulse,
   and means for controlling the time of application of said maintaining drive pulses and of said stopping drive pulse dependent on the angular position of the rotor.

2. A motor unit as in claim 1, wherein said controlling means comprises:
   means for generating an electric signal representative of the variations in the coupling coefficient of the motor in dependence on the position of the rotor; and
   means for defining the instant at which at least some of the maintaining pulses and said stopping pulse are applied to said coil in response to the representative signal.

3. A motor unit as in claim 2, wherein the representative signal is the voltage induced in the coil.

4. A motor unit as in claim 2, wherein the representative signal is the current induced in the coil.

5. A motor unit as in claim 1, wherein the maintaining pulses all are of common, fixed, duration, and the stopping pulse has a fixed duration greater than that of the maintaining pulses.

* * * * *